United States Patent
Yuan et al.

(10) Patent No.: US 7,597,585 B2
(45) Date of Patent: Oct. 6, 2009

(54) BATTERY CONNECTOR

(75) Inventors: Wei Yuan, ShenZhen (CN); Yu-San Hsiao, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/150,410

(22) Filed: Apr. 28, 2008

(65) Prior Publication Data
US 2008/0268701 A1 Oct. 30, 2008

(30) Foreign Application Priority Data
Apr. 27, 2007 (CN) .................. 2007 2 0037200

(51) Int. Cl.
*H01R 3/00* (2006.01)
(52) U.S. Cl. .......................................... 439/500
(58) Field of Classification Search ............... 439/500, 439/68, 626, 627
See application file for complete search history.

(56) References Cited
U.S. PATENT DOCUMENTS

| | | | |
|---|---|---|---|
| 5,980,309 A | 11/1999 | Frantz et al. | |
| 6,527,584 B2 * | 3/2003 | Ninomiya | 439/500 |
| 6,603,670 B1 * | 8/2003 | Chien | 361/801 |
| 6,669,504 B2 * | 12/2003 | Wu | 439/500 |
| 7,059,894 B1 * | 6/2006 | Huang | 439/500 |
| 7,238,045 B1 * | 7/2007 | Chang | 439/500 |
| 7,390,215 B2 * | 6/2008 | Liao et al. | 439/500 |
| 2004/0137786 A1 * | 7/2004 | Yu | 439/500 |

FOREIGN PATENT DOCUMENTS

TW 239602 1/1995

* cited by examiner

*Primary Examiner*—Phuong K Dinh
(74) *Attorney, Agent, or Firm*—Wei Te Chung

(57) ABSTRACT

A battery connector comprises a terminal block and a first and second terminal received in the terminal block. The terminal block comprises a base, a first protecting wall and a second protecting wall. The base, the first and second protecting wall together defines a receiving chamber. The first protecting wall defines at least a flange; the second protecting wall defines at least a resilient retaining arm relative to the flange. Under the cooperation of the flange and the resilient retaining arm, a reliable electrical connection is established between the first terminal, the second terminal and a coin battery.

1 Claim, 6 Drawing Sheets

US 7,597,585 B2

BATTERY CONNECTOR

BACKGROUND OF THE INVENTION

1. Field of the Invention

The present invention generally relates to a battery connector, and more particularly to a connector accommodating a coin battery.

2. Description of Related Art

Coin cells or batteries are often used as back up protection for electronic equipment should there be a failure in the conventional power system. The cell has a positive electrode extending along a major surface and an edge, and a negative electrode extending over the other major surface and isolated from the positive electrode. The battery is inserted into a connector housing mountable onto a circuit board, the connector hereinafter referred to as a "battery connector". It is desirable that a back up battery connector require a minimum amount of space on a circuit board within the equipment, be readily accessible for replacing a depleted battery.

Referring to U.S. Pat. No. 5,980,309 B1, it discloses a general battery connector. An insulative housing of the battery connector provides a pair of first and second vertical walls together defining a receiving space for accommodating a coin battery. Each vertical wall defines a projection extending inwardly for retaining the coin battery. By this means, there is no elastic force exerting on the surface of the coin battery, and therefore the contact engages with the coin battery in an unreliable manner. Furthermore, in the process of assembly or disassembly of the coin battery, the vertical walls have the possibility of being destroyed due to their movements outwardly.

Referring to TW patent No. 239602, it discloses a battery connector having an U-shaped positive terminal for facilitating the assembly or disassembly of the coin battery. The U-shaped terminal defines a pair of projections with cusps extending outwardly from one branch thereof and resisting against the upper surface of the coin battery. Under this condition, the cusps of the projections have a big possibility of scraping the surface of the coin battery. In addition, this U-shaped type terminal is with a high height with which is against the small form factor trend.

Hence, an improved battery connector is highly desired to overcome the disadvantages of the related art.

SUMMARY OF THE INVENTION

Accordingly, an object of the present invention is to provide a battery connector being capable of establishing a reliable electrical connection with a coin battery.

In order to achieve the object set forth, a battery connector in accordance with the present invention comprises a terminal block and a first and second terminal received in the terminal block. The terminal block comprises a base, a first protecting wall and a second protecting wall. The base, the first and second protecting wall together defines a receiving chamber. The first protecting wall defines at least a flange; the second protecting wall defines at least a resilient retaining arm relative to the flange. Under the cooperation of the flange and the resilient retaining arm, a reliable electrical connection is established between the first terminal, the second terminal and a coin battery.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
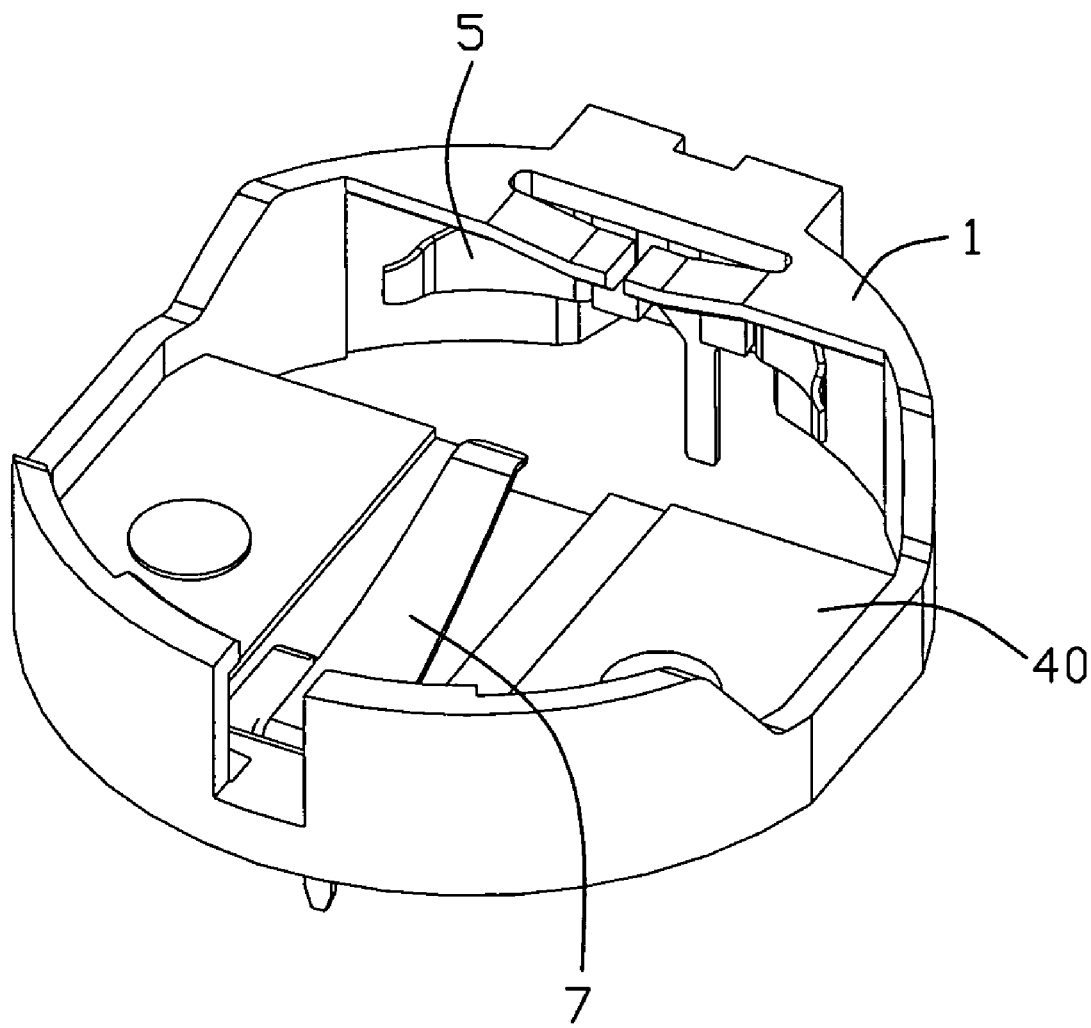
FIG. 1 is an assembled, perspective view of a battery connector in accordance with the present invention.
Figure 2:
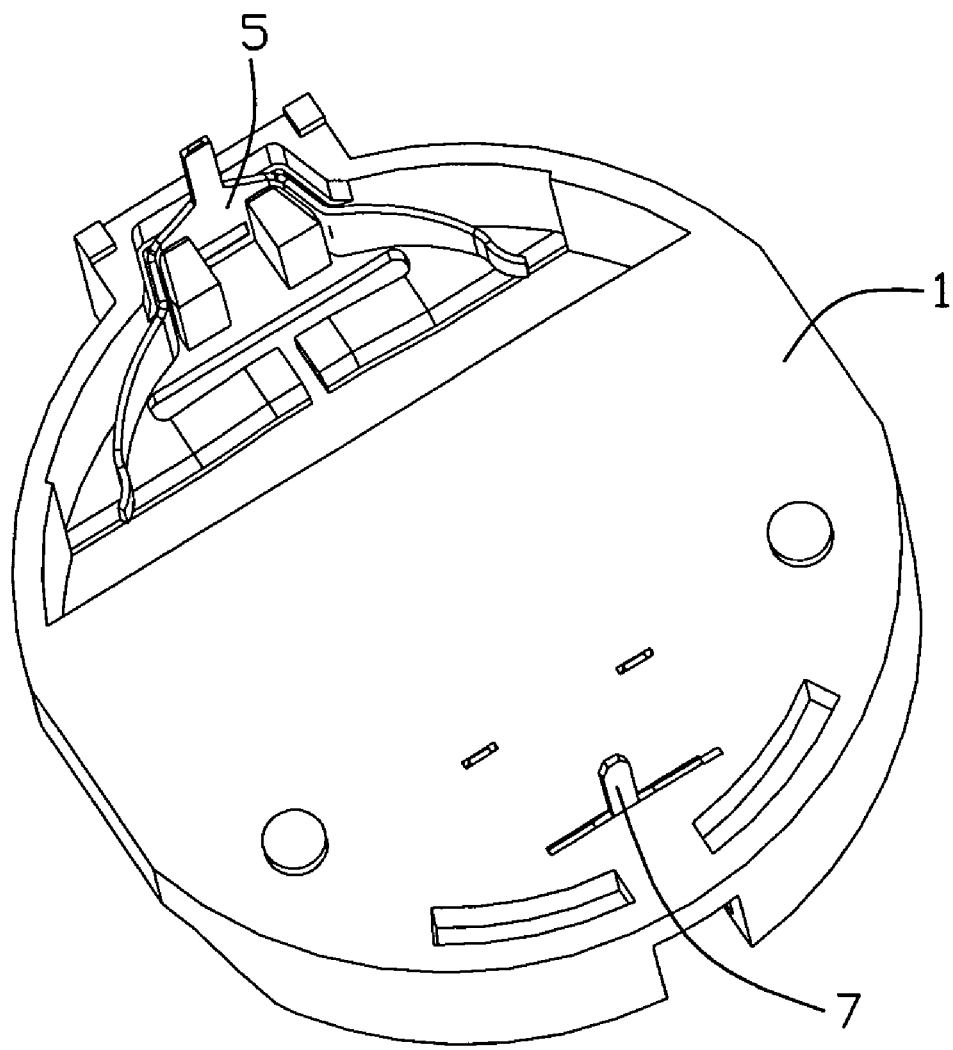
FIG. 2 is a view similar to FIG. 1, but taken from different aspect.
Figure 3:
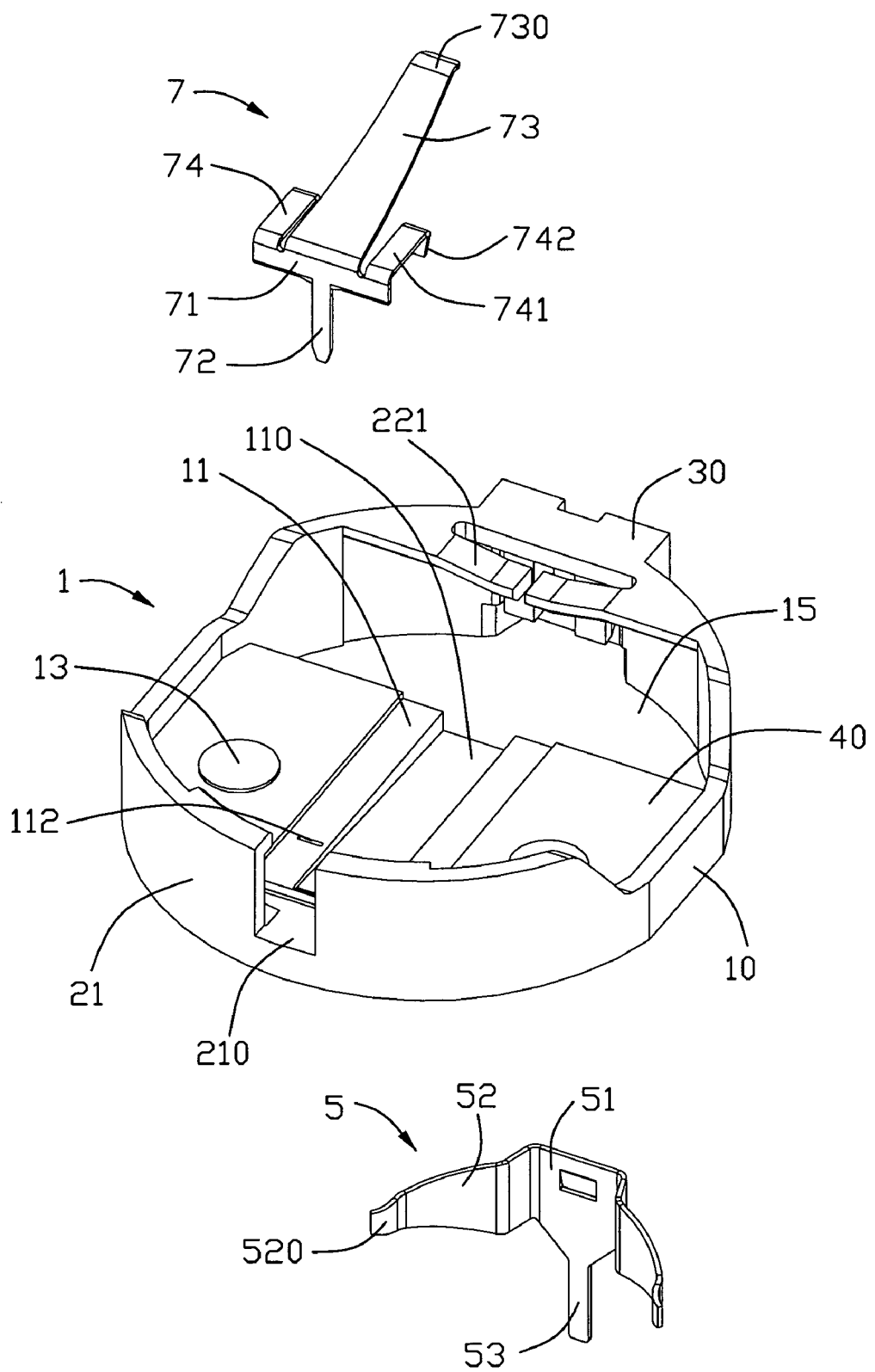
FIG. 3 is an exploded, perspective view of FIG. 1.
Figure 4:
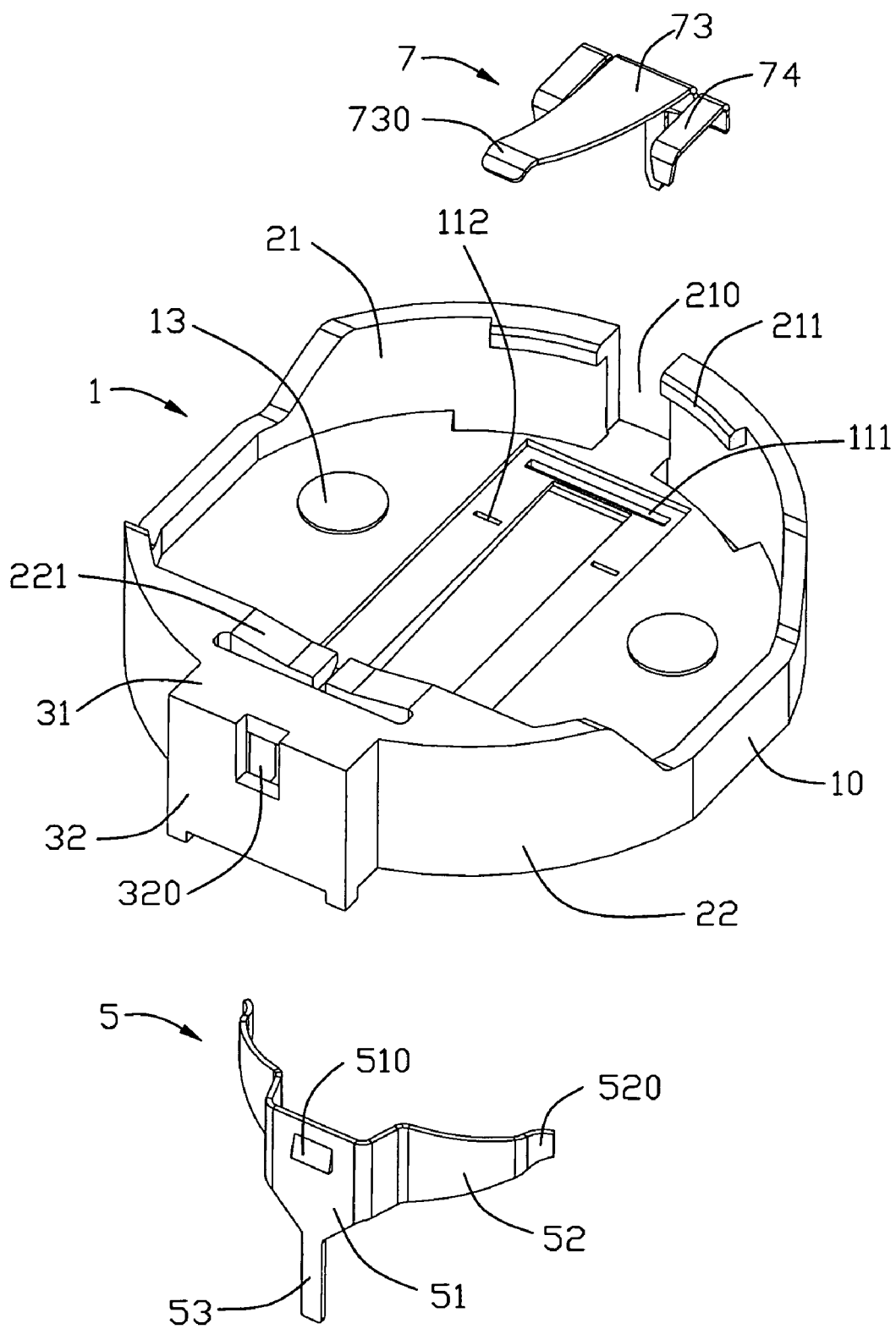
FIG. 4 is a view similar to FIG. 3, but taken from different aspect.
Figure 5:
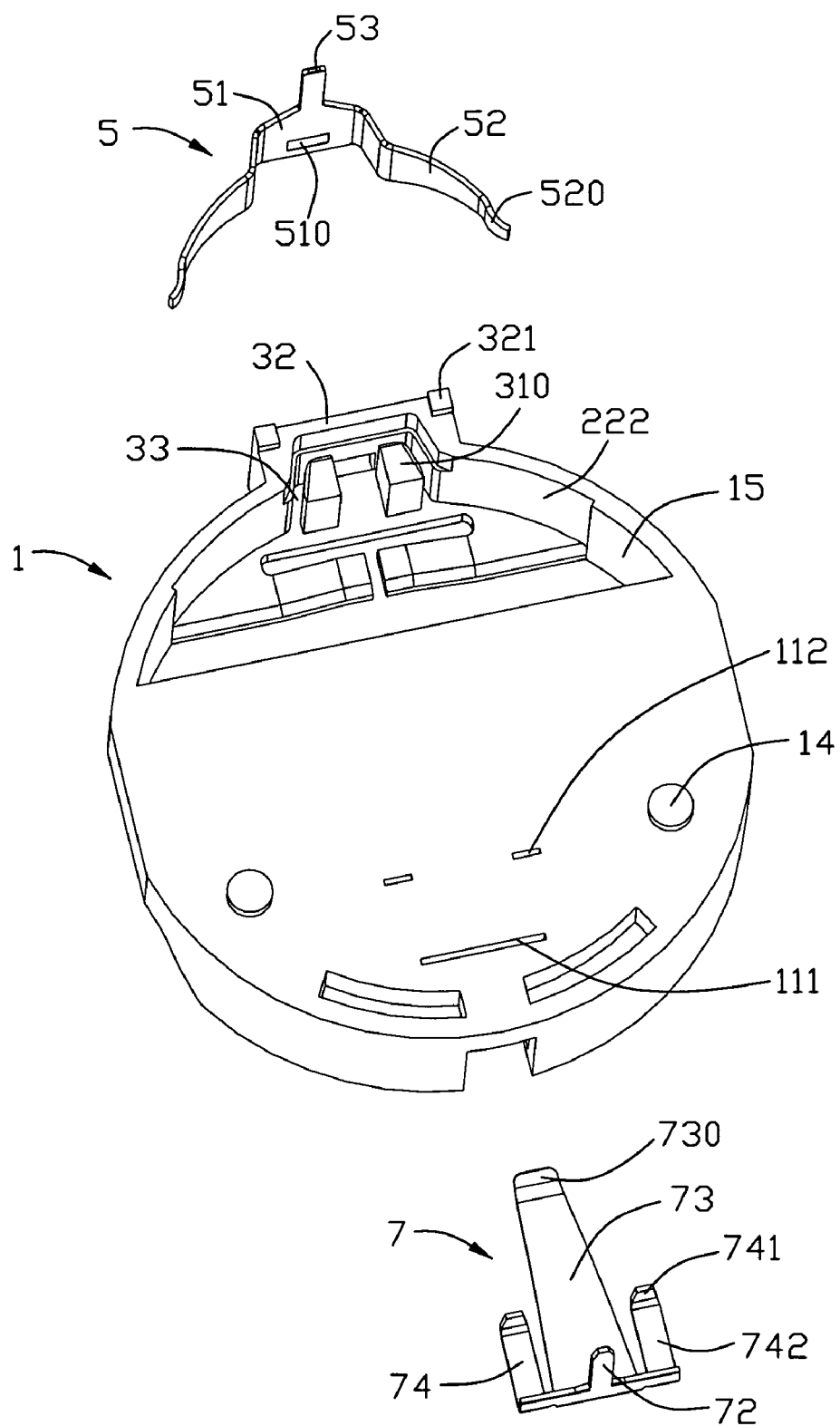
FIG. 5 is a view similar to FIG. 3, but taken from different aspect.
Figure 6:
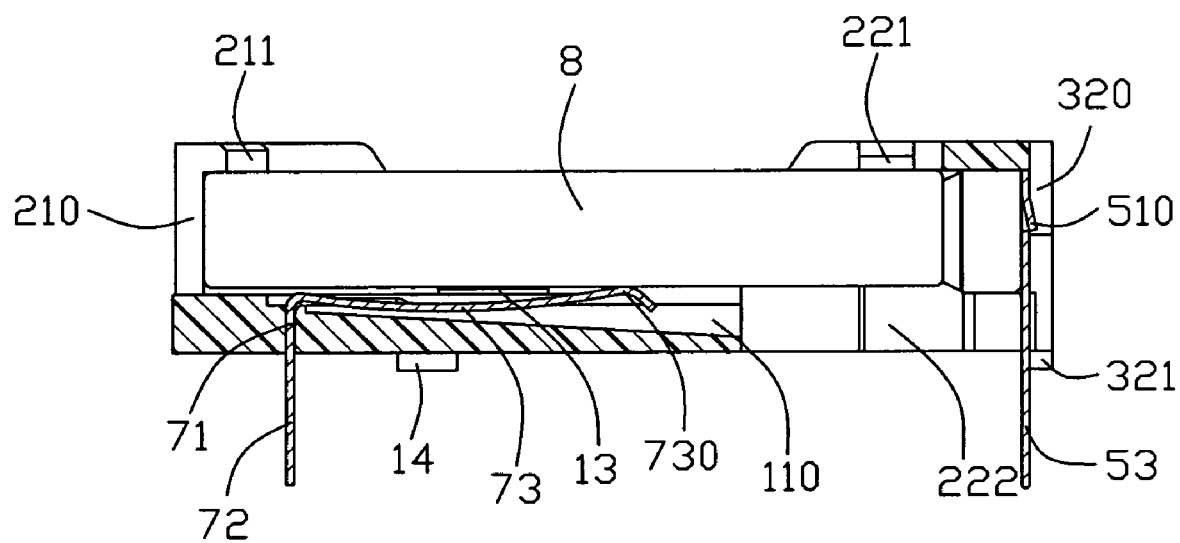
FIG. 6 is a cross-sectional view of FIG. 1.

Referring to FIGS. 1-2, a battery connector 100 in accordance with the present invention comprises a terminal block 1 and a first terminal 5 and a second terminal 7 received in the terminal block 1.

Referring to FIGS. 3-6, the terminal block 1 is of circular shape, and comprises a base 10 extending horizontally, a first and second protecting wall 21, 22 extending relative to each other and upwardly from the base 10 and a positioning seat 30 extending outwardly from the second protecting wall 22. The base 10, the first protecting wall 21 and the second protecting wall 22 together define a receiving chamber 40 for accommodating a coin battery 8. The base 10 defines a bottom surface (not labeled) for engaging with a print circuit board (not labeled), a pair of retaining posts 14 extending downwardly from the bottom surface, an upper surface (not labeled) opposite to the bottom surface and a pair of supporting posts 13 extending upwardly from the upper surface. The terminal block 1 defines a cutout 15 on the bottom surface and communicating with the receiving chamber 40 and a recessed terminal receiving place 11 on the upper surface. The terminal receiving place 11 comprises an inclined groove 110, a through slit 111 at the rear side of the inclined groove 110 and a pair of retaining slit 112 at two sides of the inclined groove 110. The first protecting wall 21 defines an operating notch 210 and a pair of flanges 211 symmetrically located at two sides of the operating notch 210. To facilitate assembly the coin battery 8, the front edges of the flanges 211 are of arc-shape. The second protecting wall 22 defines a pair of resilient retaining arms 221 at two sides of the positioning seat 30 and slantways and downwardly toward each other and a pair of recesses 222 located at two sides of the positioning seat 30 and relative to the pair of resilient retaining arms 221. The positioning seat 30 defines an upper wall 31, an outer wall 32 connecting with the upper wall 31 and a pair of spaced retaining posts 321 at the bottom thereof. The upper wall 31 defines a pair of blocks 310 extending downwardly. The pair of blocks 310 and the outer wall 32 together define a retaining passageway 33 for receiving the first terminal 5. The outer wall 32 provides an opening 320 communicating with the retaining passageway 33. Furthermore, the pair of retaining posts 321 and the pair of positioning posts 14 together define a trapezoid.

The first terminal 5 comprises an U-shaped retaining portion 51, a pair of resilient arms 52 respectively extending from two distal ends of the retaining portion 51 and a tail portion 53 extending downwardly from the retaining portion 51. Each resilient arm 52 is of arc shape, and comprises a contacting portion 520 extending away from the retaining portion 51. The retaining portion 51 defines a locking portion 510 engaging with the opening 320 of the positioning seat 30. In the preferred embodiment, the locking portion 510 is a stab.

The second terminal 7 comprises a base plate 71, a tail portion 72 extending downwardly from the base plate 71, a resilient arm 73 extending slantways and upwardly from the base plate 71 and a pair of retaining portions 74 locating at two sides of the base plate 71. The resilient arm 73 and retaining portions 74 locate at the same side of the base plate 71. The resilient arm 73 defines a contacting portion 730 at the distal end thereof. Each retaining portion 74 comprises a horizontal supporting portion 741 and a claw 742 extending downwardly from the supporting portion 741.

Referring to FIGS. 1-6, in assembly, the second terminal 7 is assemble to the terminal receiving place 11 with the terminal portion 72 passing through the through slit 111, the base plate 71 and the claws 742 of the retaining portions 74 respectively receiving in the through slit 111 and the retaining slits 112, and the resilient arm 73 protruding outwardly from the terminal receiving place 11 for electrically contacting with the cathode of the coin battery 8. Then turnover the terminal block 1, the first terminal 5 is moved toward and passing through the cutout 15 and assembled in the retaining passageway 33 with the retaining portion 51 retained in the retaining passageway 33, the resilient arms 52 received in the receiving chamber 40 relative to the recesses 222. The locking portion 510 of the retaining portion 51 engages with the opening 320 of the positioning seat 30 for preventing itself from disengaging away from the positioning seat 30.

In the process of usage, the coin battery 8 is slantways assembled into the receiving chamber 40, with the bottom surface resisting against the contacting portion 730 of the resilient arm 73 of the second terminal 7. Then, keep pushing the coin battery 8 against the resilient arms 52 of the first terminal 5 until the coin battery 8 is fully assembled in the receiving chamber 40. The coin battery 8 will be pushed back a little by the resilient arms 52 of the first terminal 5, therefore, the flanges 211 of the first protecting wall 21 clip the upper surface of the coin battery 8. The retaining arms 221 of the second protecting wall 22 elastically press the upper surface of the coin battery 8 relative to the pair of flanges 211 of the first protecting wall 21. The pair of recesses 222 of the second protecting wall are relative to the pair of resilient arms 52 of the first terminal 5, and accordingly, the resilient arms 52 are free from interferential colliding the second protecting wall 22 when the coin battery 8 resists the resilient arms 52. The pair of supporting posts 13 resist against the bottom surface of the coin battery 8 for preventing the resilient arm 73 of the second terminal 7 from deforming excessively. Under the cooperation of the flanges 211 and resilient retaining arms 221, a reliable electrically connection is established between the first terminal 5, the second terminal 7 and the coin battery 8. In addition, the pair supporting posts 13 are located between the pair of flanges 211 and the pair of resilient arm 221 as a fulcrum to strengthen the stability of the coin battery 8. In disengagement, pushing the coin battery 8 from the operating notch 210 until the upper surface depart from the pair of flanges 211 of the first protecting wall 21. Thus, the preferred embodiment is also facilitated the engagement and disengagement of the coin battery 8.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery connector, comprising:

a terminal block having a base, a first protecting wall and a second protecting wall, said base, said first and second protecting wall together defining a receiving chamber;

a first terminal and a second terminal respectively received in the terminal block; and wherein the first protecting wall defines at least a flange, the second protecting wall defines at least a resilient retaining arm relative to the flange, wherein the second protecting wall defines a pair of resilient retaining arms slantways and downwardly extending toward each other, wherein the first protecting wall defines an operating notch and a pair of flanges symmetrically located at two sides of the operating notch, wherein the base defines a pair of supporting posts spaced and located between the pair of flanges of the first protecting wall and the pair of resilient retaining arms of the second protecting wall, wherein the terminal block defines a positioning seat having an upper wall and an outer wall connecting with the upper wall, wherein the upper wall of the positioning seat defines at least a block, said block and the outer wall together defines a retaining passageway, wherein the second protecting wall defines a pair of recesses located at two sides of the positioning seat and communicating with the receiving chamber, wherein the first terminal comprises a retaining portion, a pair of resilient arms extending outwardly from the retaining portion and a tail portion extending downwardly from the retaining portion, said retaining portion is received in the terminal receiving passageway, said pair of resilient arms are received in the receiving chamber relative to the pair of recesses, wherein the positioning seat defines a pair of positioning posts at the bottom thereof, wherein the base defines a pair of retaining posts at the bottom thereof, wherein the pair of positioning posts and the pair of retaining posts together define a trapezoid, wherein the base defines a recessed terminal receiving place having an inclined slot, a pair of retaining slits located at two sides of the inclined groove and a through slit located at the rear side thereof, wherein the second terminal comprises a base plate located in the through slit, a tail portion downwardly extending from the base plate and passing through the through slit, a resilient arm extending slantways and upwardly from the base plate and located above the inclined groove and a pair of retaining arms extending forwardly from the base plate and engaging with the retaining slits, said resilient arm defines a contacting portion at the distal end thereof.

* * * * *